United States Patent
Duesterwald et al.

(10) Patent No.: US 11,294,759 B2
(45) Date of Patent: Apr. 5, 2022

(54) DETECTION OF FAILURE CONDITIONS AND RESTORATION OF DEPLOYED MODELS IN A COMPUTING ENVIRONMENT

(71) Applicant: International Business Machines Corporation, Armonk, NY (US)

(72) Inventors: Evelyn Duesterwald, Millwood, NY (US); Punleuk Oum, Tarrytown, NY (US); Gaodan Fang, Elmsford, NY (US); Debashish Saha, White Plains, NY (US); Anupama Murthi, Pleasantville, NY (US); Waldemar Hummer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 16/704,083

(22) Filed: Dec. 5, 2019

(65) Prior Publication Data

US 2021/0173736 A1    Jun. 10, 2021

(51) Int. Cl.
  *G06F 11/07*    (2006.01)
  *G06N 20/00*    (2019.01)

(52) U.S. Cl.
  CPC ........ *G06F 11/0793* (2013.01); *G06F 11/079* (2013.01); *G06F 11/0751* (2013.01); *G06F 11/0772* (2013.01); *G06N 20/00* (2019.01)

(58) Field of Classification Search
  CPC ............. G06F 11/0793; G06F 11/0751; G06F 11/0772; G06F 11/079; G06N 20/00
  See application file for complete search history.

(56) References Cited

U.S. PATENT DOCUMENTS

| | | | |
|---|---|---|---|
| 7,983,901 B2 * | 7/2011 | Acero | G06F 40/30 704/9 |
| 8,555,238 B2 * | 10/2013 | White | G06F 8/30 717/100 |
| 9,058,317 B1 | 6/2015 | Gardner et al. | |

(Continued)

FOREIGN PATENT DOCUMENTS

| | | |
|---|---|---|
| CN | 108447024 A | 8/2018 |
| WO | 2018213205 A1 | 11/2018 |
| WO | 2019002603 A1 | 1/2019 |

OTHER PUBLICATIONS

C.H. Cai et al., "B-Repair: Repairing B-Models Using Machine Learning", 23rd International Conference on Engineering of Complex Computer Systems (ICECCS), 2018, pp. 31-40.

(Continued)

*Primary Examiner* — Matthew M Kim
*Assistant Examiner* — Indranil Chowdhury
(74) *Attorney, Agent, or Firm* — Randall Bluestone; Ryan, Mason & Lewis, LLP (57) ABSTRACT

A computer-implemented method includes obtaining data associated with execution of a model deployed in a computing environment. At least a portion of the obtained data is analyzed to detect one or more failure conditions associated with the model. One or more restoration operations are executed to generate one or more restoration results to address one or more detected failure conditions. At least a portion of the one or more restoration results is sent to the computing environment in which the model is deployed.

20 Claims, 8 Drawing Sheets

(56) References Cited

U.S. PATENT DOCUMENTS

| | | | | |
|---|---|---|---|---|
| 11,210,140 | B1* | 12/2021 | Gold | G06F 3/0649 |
| 2012/0072769 | A1* | 3/2012 | Goldszmidt | G06F 11/3055 |
| | | | | 714/15 |
| 2015/0161385 | A1* | 6/2015 | Gounares | G06F 21/577 |
| | | | | 726/25 |
| 2016/0077816 | A1* | 3/2016 | Eilam | G06F 8/60 |
| | | | | 717/177 |
| 2016/0358098 | A1 | 12/2016 | Duesterwald et al. | |
| 2017/0308800 | A1* | 10/2017 | Cichon | G06T 1/20 |
| 2018/0039894 | A1* | 2/2018 | Farrell | G06N 5/022 |
| 2018/0053095 | A1* | 2/2018 | Farrell | G06F 16/00 |
| 2019/0227861 | A1* | 7/2019 | Majumder | G06Q 30/016 |
| 2019/0361759 | A1* | 11/2019 | Haugen | G06F 11/079 |
| 2020/0097389 | A1* | 3/2020 | Smith | G06F 11/0775 |
| 2020/0234162 | A1* | 7/2020 | Jayaraman | G06N 20/00 |
| 2020/0302332 | A1* | 9/2020 | Contreras | G06F 40/279 |
| 2020/0379454 | A1* | 12/2020 | Trinh | G06N 3/0454 |
| 2021/0004284 | A1* | 1/2021 | Vah | G06F 11/079 |
| 2021/0019249 | A1* | 1/2021 | Gnaneswaran | G06N 20/00 |
| 2021/0026750 | A1* | 1/2021 | Shukla | G06F 11/366 |
| 2021/0049144 | A1* | 2/2021 | Liang | G06F 11/1469 |
| 2021/0132927 | A1* | 5/2021 | Dinh | G06Q 10/0631 |
| 2021/0216408 | A1* | 7/2021 | Huskisson | G06F 16/125 |
| 2021/0263654 | A1* | 8/2021 | Sears | G06F 3/065 |
| 2021/0303388 | A1* | 9/2021 | George | G06F 11/0709 |
| 2022/0005077 | A1* | 1/2022 | Krishnamurthy | H04W 8/186 |

OTHER PUBLICATIONS

Hummer et al., "ModelOps: Cloud-based Lifecycle Management for Reliable and Trusted AI," 2019 IEEE International Conference on Cloud Engineering, Jun. 2019, pp. 113-120.

U.S. Appl. No. 16/262,443, filed Jan. 30, 2019 and entitled "System for Constructing Effective Machine-Learning Pipelines with Optimized Outcomes."

Kubeflow.Org, "Build a Pipeline," https://www.kubeflow.org/docs/pipelines/pipelines-overview, Nov. 24, 2021, 8 pages.

Github.com, "GitHub-Trusted-AI/Adversarial-Robustness-Toolbox: Adversarial Robustness Toolbox (ART)—Python Library for Machine Learning Security-Evasion, Poisoning, Extraction, Inference," Adversarial Robustness Toolbox (ART) v1.8, printed Dec. 9, 2021, 4 pages.

Github.com, "Trusted-AI/AIF 360: A Comprehensive Set of Fairness Metrics for Datasets and Machine Learning Models, Explanations for these Metrics, and Algorithms to Mitigate Bias in Datasets and Models," Adversarial Robustness Toolbox(ART) v1.8, printed Dec. 9, 2021, 6 pages.

Mlflow.org, "Quickstart," https://mlflow.org/docs/latest/quickstart.html, Dec. 9, 2021, 5 pages.

A. Sood et al., "Neunets: An Automated Synthesis Engine For Neural Network Design," arXiv: 1901.06261v1, Jan. 17, 2019, 14 pages.

Cloud.ibm.com, "Watson Machine Learning," https://arxiv.org/abs/1901.06261, May 1, 2016, 273 pages.

M. Wistuba et al., "Automatic Frankensteining: Creating Complex Ensembles Autonomously," Proceedings of the SIAM International Conference on Data Mining (SDM), Apr. 27-29, 2017, pp. 741-749.

M. Wistuba et al., "Hyperparameter Optimization Machines," IEEE International Conference on Data Science and Advanced Analytics (DSAA), Oct. 17-19, 2016, 10 pages.

* cited by examiner

DETECTION OF FAILURE CONDITIONS AND RESTORATION OF DEPLOYED MODELS IN A COMPUTING ENVIRONMENT

BACKGROUND

The present application relates to computing systems that are configured to manage application software programs (applications), particularly applications that include artificial intelligence (AI) models. Applications that have AI models have complex lifecycles. A lifecycle of an application typically is a time span associated with the application, for example, from the initial conception/design of the application through deployment, maintenance, and eventually retirement. Management of the lifecycle of an application that includes an AI model presents challenges.

SUMMARY

Embodiments of the invention provide techniques for managing deployed models such as, but not limited to, artificial intelligence models. For example, illustrative embodiments are particularly well suited for managing artificial intelligence models deployed in the context of one or more applications.

In one illustrative embodiment, a computer-implemented method comprises the following steps. Data associated with execution of a model deployed in a computing environment is obtained. At least a portion of the obtained data is analyzed to detect one or more failure conditions associated with the model. One or more restoration operations are executed to generate one or more restoration results to address one or more detected failure conditions. At least a portion of the one or more restoration results is sent to the computing environment in which the model is deployed.

In another illustrative embodiment, a computer-implemented method comprises the following steps. A detection and restoration framework is instantiated. The instantiated detection and restoration framework is coupled to a computing environment in which a model is deployed. The instantiated detection and restoration framework is configured to obtain data associated with execution of the model, analyze at least a portion of the obtained data to detect one or more failure conditions associated with the model, execute one or more restoration operations to generate one or more restoration results to address one or more detected failure conditions, and send at least a portion of the one or more restoration results to the computing environment in which the model is deployed.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Illustrative embodiments may be described herein with reference to exemplary computing environments, cloud infrastructure, data repositories, data centers, data processing systems, computer systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud platform," "cloud computing environment," "cloud infrastructure," "data repository," "data center," "data processing system," "computer system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above in the background section, applications that include artificial intelligence (AI) models have complex lifecycles. Recently, technology has been developed to help orchestrate and automate significant portions of the lifecycle. For example, Kubeflow technology (to name just one example) provides an open-source platform that includes a catalog of re-usable components for common stages of the application lifecycle that enable users to construct lifecycle pipelines for machine learning (ML) applications that are orchestrated as workflows using these components. It is to be understood that the term "machine learning" (ML) may be used interchangeably with the term "artificial intelligence" (AI).

However, with existing platforms, there does not exist pre-built or re-usable support to cover important post-deployment parts of a lifecycle of an application. For example, if an application needs to support any form of automated failure recovery or continuous improvement, the lifecycle support for these capabilities has to be custom-built for each application on an existing platform.

Illustrative embodiments overcome the above and other drawbacks associated with existing application lifecycle management technologies. More particularly, illustrative embodiments provide a configurable snapback framework that implements runtime detection and restoration for detected failure conditions in deployed AI models. Advantageously, such a framework (e.g., a set of one or more framework configurations) replaces the complex manual (e.g., custom-built) development of model restoration logic. As will be illustrated in the context of the figures and described in further detail below, the framework is configured and instantiated with a set of failure detection components and associated model restoration pipelines. Once instantiated, the framework plugs into a given lifecycle using logs as inputs and delivers new model artifacts for a new model version into the existing lifecycle pipelines. In one or more illustrative embodiments, the framework is a cloud-based framework and platform for end-to-end development and lifecycle management of AI applications.

Figure 1:
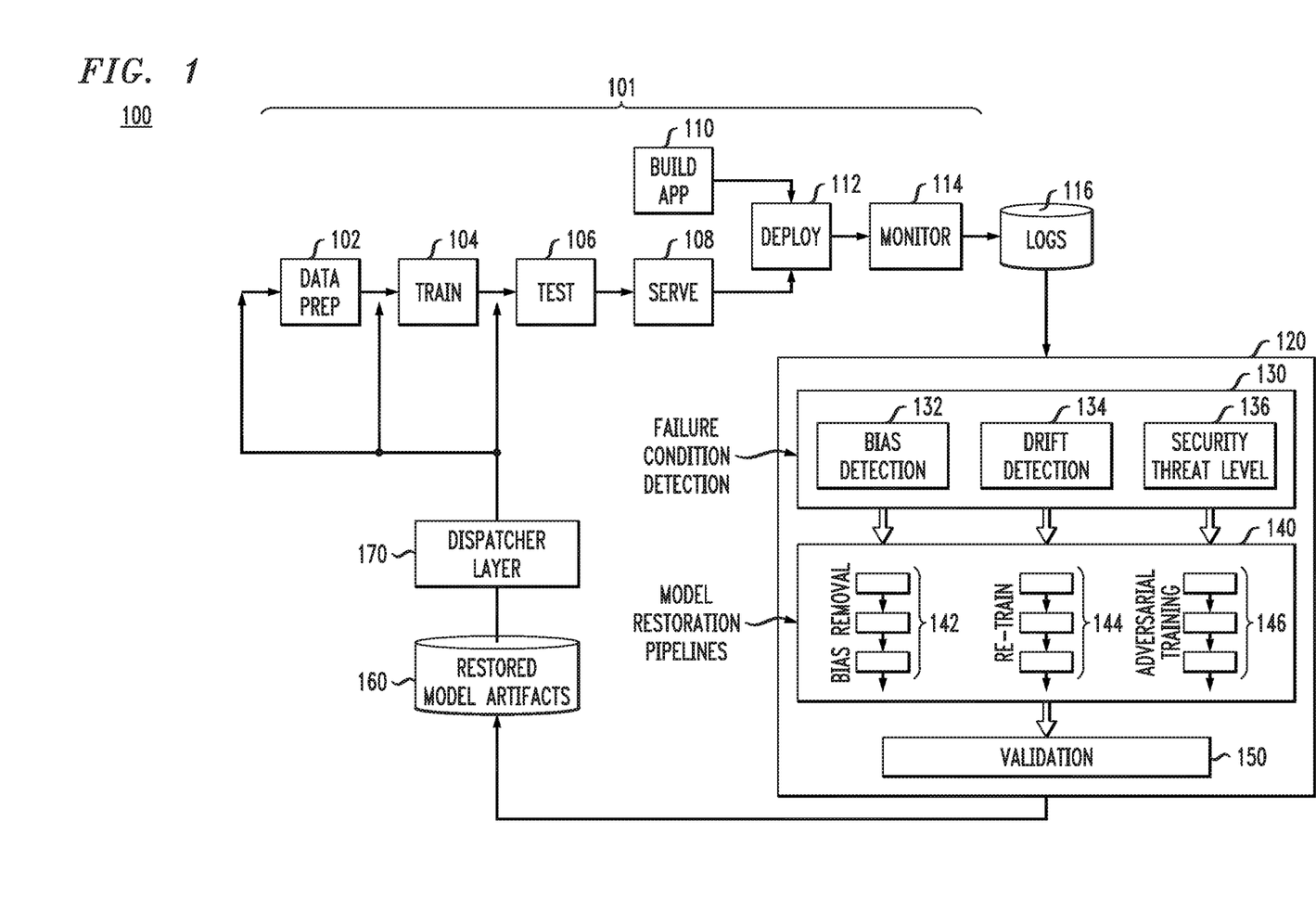
FIG. 1 depicts a system with a configurable snapback framework for runtime restoration of an artificial intelligence model, according to an illustrative embodiment.

FIG. 1 depicts a system 100 with a configurable snapback framework for runtime restoration of an artificial intelligence model, according to an illustrative embodiment. As shown, a lifecycle pipeline 101 comprises a plurality of lifecycle components including a data preparation (prep) component 102, a train component 104, a test component 106, a serve component 108, a build application (app) component 110, a deploy component 112 and a monitor component 114.

As is known, for an AI model, a data set is prepared (102) that is then used as a training data set to train (104) an initially-created AI model. Typically, the training data set is used to ensure that the AI model accurately recognizes patterns in data. Testing (106) is then done using test data to determine how well the AI model can predict new results based on its training. Further training and testing of the AI model can be iterated to improve the accuracy of the AI model. The AI model can then be served (108) for deployment (112) as a model or be built into a part of an application (110) and then deployed with the application. The deployed AI model is then monitored (114) during its real time use. Note that one or more of the components of lifecycle pipeline 101 (e.g., data prep component 102, train component 104, test component 106, serve component 108, build app component 110, deploy component 112 and monitor component 114) can itself include a pipeline of components. By way of example only, train component 104 may include a pipeline of components that perform sub-steps (not expressly shown) of the training process.

The components in lifecycle pipeline 101 are available through existing lifecycle management platforms. For example, infrastructure to specify, execute and manage AI lifecycle pipelines can include one or more of Kubeflow, ModelOps, and MLflow. Further, examples of training platforms based on specified training job inputs that produce model versions that can be pushed into deployment include Watson Machine Learning, Google Cloud ML Engine, and Amazon Web Services (AWS), which operationalize underlying training frameworks including Tensorflow, PyTorch and Caffe. Still further, examples of approaches to automate individual or a set of lifecycle stages in the pre-deployment part of the lifecycle (e.g., feature engineering, model creation, model configuration, etc.) include NeuNet's automated synthesis engine for neural network design, KaggleBot, and Hyperparameter Optimization Machines. The above are only a few examples of technologies that can be used to enable lifecycle stages such as data prep (102), training (104), testing (106), serving (108), building app (110), deploying (112) and monitoring (114) as shown in lifecycle pipeline 101.

As further shown in FIG. 1, a snapback framework 120 is configured and instantiated with a set of failure detection components and associated model restoration pipelines, as will be further explained. The framework 120, once instantiated, plugs into the lifecycle pipeline 101 using logs 116 as inputs and delivers restored (new) model artifacts 160 for a restored (new) model version into the existing lifecycle pipeline 101. It is to be appreciated that the AI model following a failure condition may be restored back to an existing version or a new version, depending on the application requirements within which the AI model executes.

More particularly, framework 120 comprises a failure condition detection stage 130 with a configurable set of failure condition detection components such as, e.g., a bias detection component 132, a drift detection component 134 and a security threat level component 136. The failure condition detection stage 130 analyzes input data and detects failure conditions (e.g., model bias, model drift and model security threat) with a set of custom or pre-built components (e.g., bias detection component 132, a drift detection component 134 and a security threat level component 136, respectively) that trigger failure conditions based on supplied thresholds. As mentioned, the set of components that constitute the failure condition detection stage 130 are configurable.

"Model bias," as illustratively used herein, relates to whether a model discriminates against a protected attribute in its feature space. Consider, for example, a model that uses age as a feature. If the model demonstrates bias in its prediction favoring a particular age group, it would be considered unfair, as it discriminates against a protected attribute (age group in this case). Typically, a fairness condition occurs when a model exhibits a trend of bias in its predictions against a protected attribute. Thus, a model bias value that reaches a predetermined threshold triggers a failure condition that causes a bias removal operation.

"Model drift," as illustratively used herein, in predictive analytics and machine learning is also known as "concept drift" and typically means that the statistical properties of the target variable, which the model is trying to predict, change over time in an unpredictable manner causing the predictions of the model to become less accurate over time. Thus, a model drift value that reaches a predetermined threshold triggers a failure condition that causes a re-training operation.

"Model security threat level," as illustratively used herein, refers to a level of security threat that the model faces or to which it is susceptible. For example, threats can include hacking of an AI-based application for malicious purposes. Attack vectors for such threats may include targeted abuse of observed flaws in the model's statistical properties, often called an "adversarial attack." Thus, a security threat level that reaches a predetermined threshold triggers a failure condition that causes the framework to learn characteristics about the threat in order to re-train the model to minimize or prevent the threat, i.e., an "adversarial training" operation.

Further, framework 120 comprises a set of model restoration pipelines 140 with a bias removal pipeline 142 operatively coupled to the bias detection component 132, a re-train pipeline 144 operatively coupled to the drift detection component 134, and an adversarial training pipeline 146 operatively coupled to the security threat level component 136. Thus, each failure condition is associated with a restoration pipeline to address the particular failure condition and produce new (restored) model artifacts. That is, bias removal pipeline 142 addresses model bias when triggered by bias detection component 132, re-train pipeline 144 addresses model drift when triggered by drift detection component 134, and adversarial training pipeline 146 addresses security threats when triggered by security threat level component 136. In one or more illustrative embodiments, one or more pipelines of the set of restoration pipelines 140 can be pre-built or custom-built. Further, one or more pipelines of the set of restoration pipelines 140 may replicate portions of the existing training component 104 in pipeline 101 as well.

Still further, framework 120 comprises a validation component 150 that ensures that the restored model artifacts improve over the current log version that causes the failure. New model artifacts 160 are provided to dispatcher layer 170 which, depending on the model restoration pipeline (142, 144 or 146), selects different re-entry points in pipeline 101 (e.g., data prep 102, train 104, test 106, serve 108, build app 110, deploy 112 and monitor 114). The above-mentioned components and their functions will be described in further detail below in the context of FIGS. 2, 3 and 4.

Figure 2:
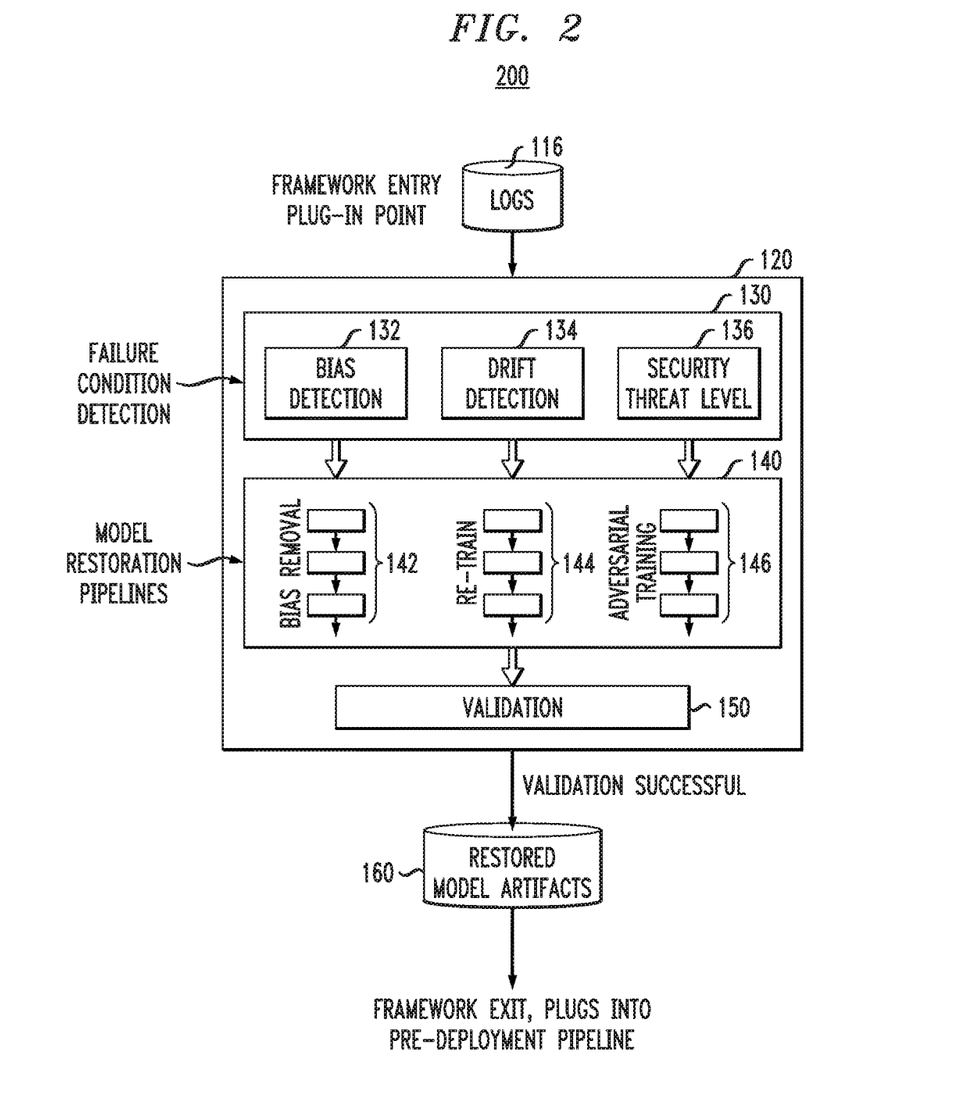
FIG. 2 depicts an instantiation of the configurable snapback framework of FIG. 1, according to an illustrative embodiment.

Turning now to FIG. 2, an instantiation of the configurable snapback framework of FIG. 1 is depicted, according to an illustrative embodiment. It is to be understood that instantiation 200 depicted in FIG. 2 of the configurable snapback framework 120 (FIG. 1) represents one instantiation per monitored AI model. Instantiation 200 of framework 120 will be described in the following steps. It is to be understood, however, that the order of the steps and/or the division of processes within each step described below can be different in alternative embodiments.

Step 1: Configuring failure condition detection stage 130. During this step, a user (e.g., system and/or administrator) provides a configuration for one or more detection components. More particularly, a set of pre-built components is selected and/or custom detection component implementations are added to instantiate the configuration. Thus, as illustratively depicted in failure condition detection stage 130, it is assumed that bias detection component 132, drift detection component 134 and security threat level component 136 are selected from a catalog of pre-built components and/or custom-built implementations, based on specific failure detection criteria with which the AI model is intended to operate. Each detection component (e.g., 132, 134, 136) takes as input a model usage log file from logs 116 and may also be configured to access current model version artifacts from logs 116 (for white-box model failure detection). As described above, the detection stage 130 is configured with corresponding predetermined thresholds that trigger detection.

Step 2: Configuring restoration pipelines 140. As explained above, each detection component (e.g., 132, 134, 136) requires a restoration pipeline. Again, similar to configuring the failure detection stage 130, users configure the restoration pipelines 140 by choosing between configuring one or more pre-built pipelines and/or provide one or more of their own custom pipeline specifications. Thus, as illustratively depicted in FIG. 2, restoration pipelines 140 comprise a bias removal pipeline 142 operatively coupled to the bias detection component 132, a re-train pipeline 144 operatively coupled to the drift detection component 134, and an adversarial training pipeline 146 operatively coupled to the security threat level component 136.

Step 3: Configuring plug-in points. In illustrative embodiments, an instantiation of the framework 120 is connected to logs 116 for each deployed AI model. Thus, as illustratively depicted in FIG. 2, instantiation 200 is connected to existing lifecycle pipeline 101 through logs 116. Further, an appropriate pipeline (101) re-entry point for restored model artifacts 160 resulting from each model restoration pipeline is configured by the user. As illustratively depicted in FIG. 2, instantiation 200 feeds back to existing lifecycle pipeline 101 through restored model artifacts 160 (and then dispatcher layer 170 as illustratively depicted in FIG. 1).

Figure 3:
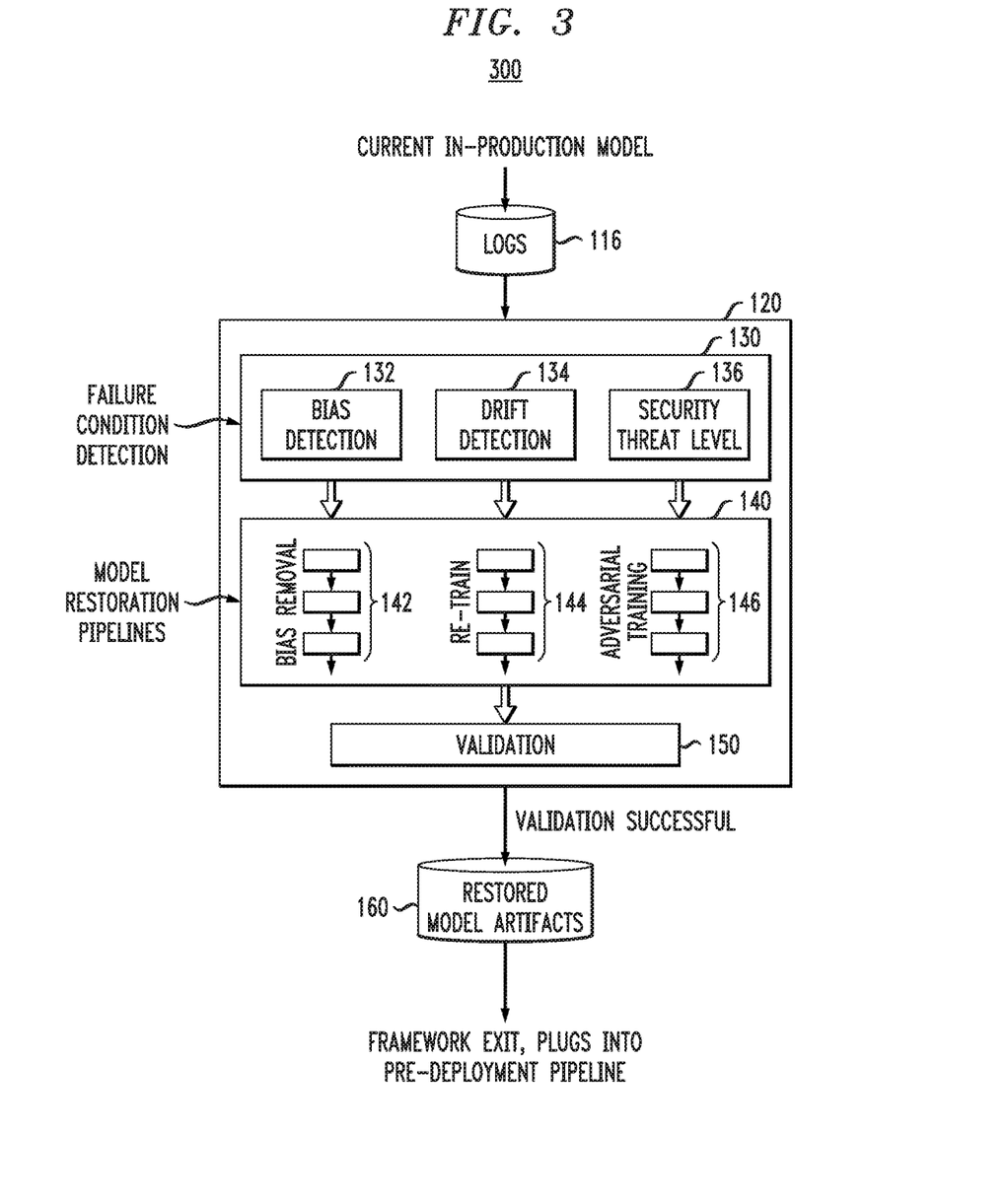
FIG. 3 depicts an operation of the configurable snapback framework of FIG. 1 during runtime, according to an illustrative embodiment.

Turning now to FIG. 3, an operation of the configurable snapback framework of FIG. 1 during runtime is depicted, according to an illustrative embodiment. More particularly, runtime operation 300 of the configurable snapback framework 120 (FIG. 1) represents a runtime operation of one instantiation per monitored AI model. Runtime operation 300 of framework 120 will be described in the following steps. It is to be understood, however, that the order of the steps and/or the division of processes within each step described below can be different in alternative embodiments.

Accordingly, FIG. 3 illustratively depicts operation of the framework during runtime for an illustrative embodiment comprising a single pipeline trigger mode. At application runtime, the instantiated snapback framework 120 operates concurrently with the execution of the current application and serving of the model version.

Step 1: Framework 120 waits for a new window of log data (logs 116) to accumulate.

Step 2: Framework 120 invokes the configured failure detection components in failure detection stage 130 on the log data window. The detection components (e.g., 132, 134, 136) concurrently operate on the log data and each may trigger an alert based on configured thresholds, as described above.

Step 3: The most significant identified failure among the triggered detections (e.g., failure condition that generates the highest value (e.g., score) above its given threshold) is identified and the associated restoration pipeline (142, 144, 146) is triggered.

Step 4: The triggered restoration pipeline executes resulting in the generation of restored model artifacts.

Step 5: The restored model artifacts are passed to a validation stage 150 where they are compared to the earlier version of the model that triggered restoration.

Step 6: If validation fails (e.g., it is determined that the restored model artifacts do not improve the scores obtained by the detection components), an alert is raised. Otherwise, if validation succeeds, the restored model artifacts 160 are pushed into the re-entry plug point of the existing pipeline 101 to trigger a new version to be deployed.

Step 7: return to step 1.

Figure 4:
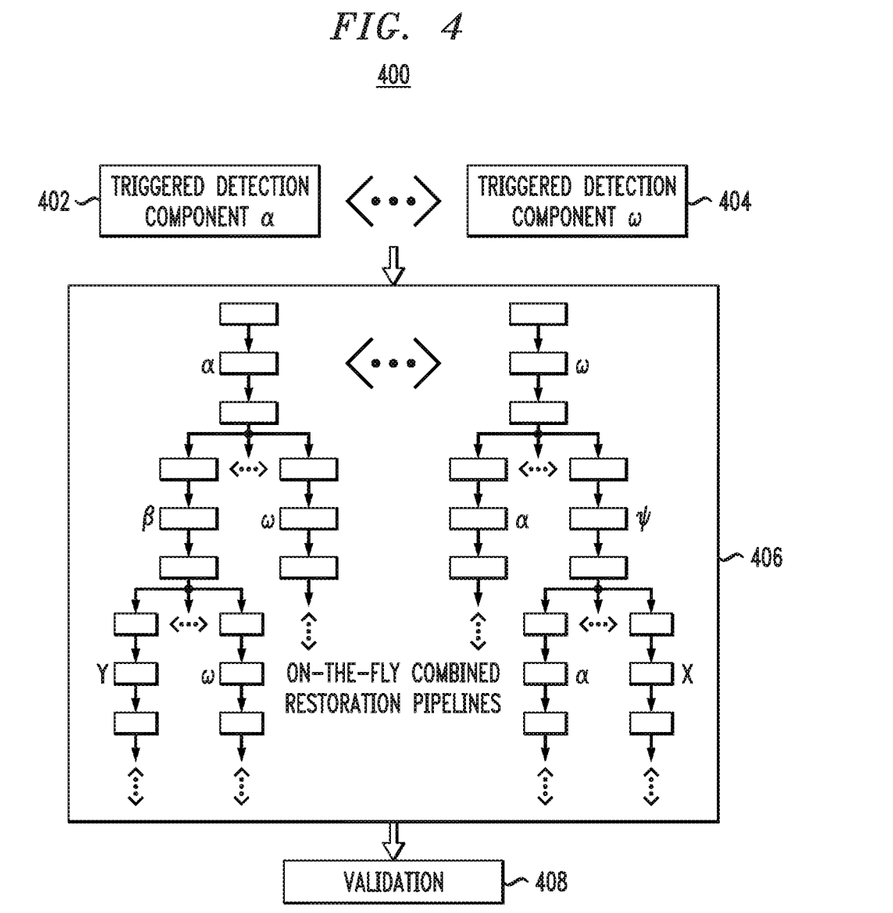
FIG. 4 depicts operations of the configurable snapback framework of FIG. 1 during runtime, according to other illustrative embodiments.

FIG. 4 depicts operations of the configurable snapback framework of FIG. 1 during runtime, according to other illustrative embodiments. More particularly, variations of the framework operation shown in FIG. 3 are possible when more than one failure detection component (e.g., 132, 134, 136) triggers an alert. When such a scenario occurs, the framework 120 produces multiple model versions. For example, as shown in scenarios 400 in FIG. 4, assume that triggered failure detection component 402 and triggered failure detection component 404 result in one or more restoration pipelines 406 being configured which generate multiple model versions that are validated 408.

For example, in one embodiment of FIG. 4, all triggered restoration pipelines execute concurrently, all restored model versions are validated, and the N versions with the strongest validation results proceed to be pushed as a restored (new) model artifacts.

In another illustrative embodiment of FIG. 4, a combined restoration pipeline is dynamically constructed (on-the-fly) based on the individual pipelines that address a combination of failure detection triggers. The combined on-the-fly pipeline can be constructed through empirical search of an optimal combination. The on-the-fly pipeline produces one or more sets of restored model artifacts which are validated and pushed as a restored (new) model artifact.

In one or more illustrative embodiments, as mentioned above, failure detection conditions and restoration pipelines are configurable to generate restored model artifacts.

For example, for model bias, the failure condition component (132) can implement techniques from the AI Fairness 360 open source toolbox which detects bias in a model's predictions. Then, the bias removal pipeline (142) removes bias by removing and changing skew in the training data. The restored model artifacts (160) could then be a new version of the training data with bias removed.

For example, for model drift, the failure condition component (134) can detect feature drift in the inputs that are sent to a model using established drift detection techniques on the model's log data. Then, the re-train pipeline (144) restores a model's performance as a result of detected drift by modifying the feature distribution in the training data to match the production traffic. The restored model artifacts (160) could then be a new version of the training data.

For example, for security threats/robustness, the failure condition component (136) can detect security attacks on the model using techniques from the open source ART toolbox. Then, the adversarial train pipeline (146) improves a model's robustness by retraining the model using an adversarial training routine. The restored model artifacts (160) could then be a new version of the trained model.

Figure 5A:
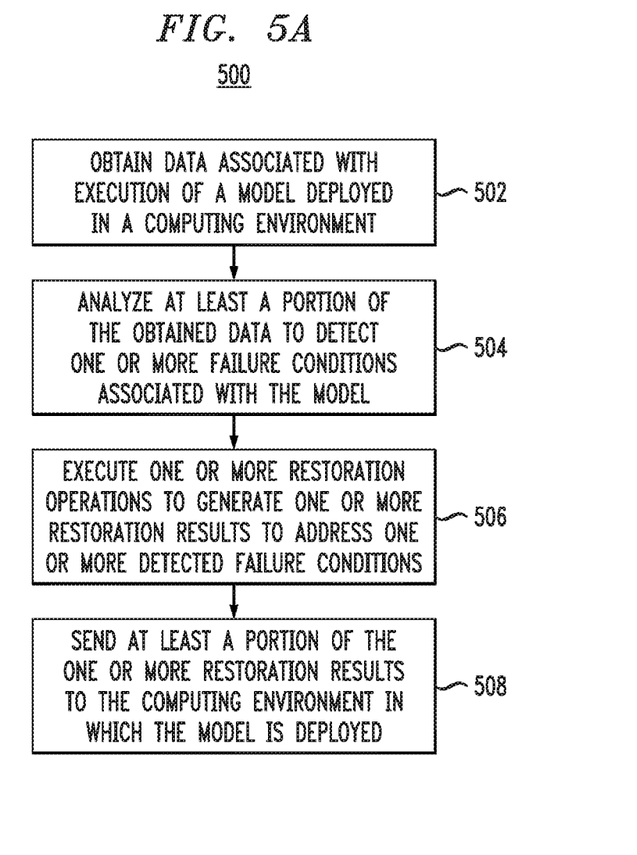
FIG. 5A depicts a methodology for runtime detection and restoration for detected failure conditions in deployed models, according to an illustrative embodiment.

FIG. 5A depicts a methodology 500 for runtime detection and restoration for detected failure conditions in deployed models, according to an illustrative embodiment.

Step 502 obtains data associated with execution of a model deployed in a computing environment.

Step 504 analyzes at least a portion of the obtained data to detect one or more failure conditions associated with the model.

Step 506 executes one or more restoration operations to generate one or more restoration results to address one or more detected failure conditions.

Step 508 sends at least a portion of the one or more restoration results to the computing environment in which the model is deployed.

For example, in one or more illustrative embodiments, the methodology can accept as input a set of machine learning model serving logs, analyze the logs with a set of failure condition modules, triggers a set of model restoration pipelines based on detected failures, and push one or more restored model artifacts into model deployment platforms.

Figure 5B:
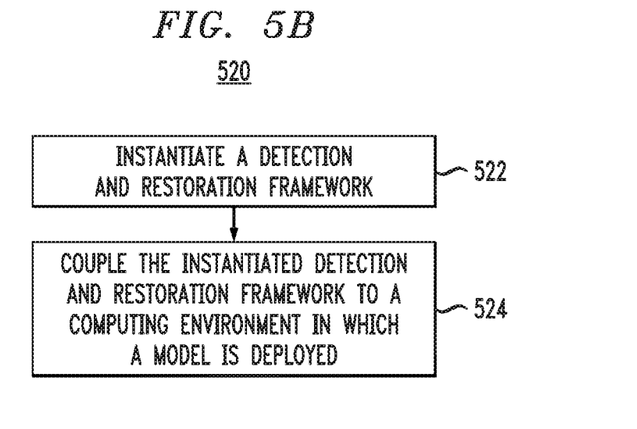
FIG. 5B depicts a methodology for instantiating a detection and restoration framework for detected failure conditions in deployed models, according to an illustrative embodiment.

FIG. 5B depicts a methodology 520 for instantiating a detection and restoration framework for detected failure conditions in deployed models, according to an illustrative embodiment.

Step 522 instantiates a detection and restoration framework.

Step 524 couples the instantiated detection and restoration framework to a computing environment in which a model is deployed.

The instantiated detection and restoration framework is configured to obtain data associated with execution of the model, analyze at least a portion of the obtained data to detect one or more failure conditions associated with the model, execute one or more restoration operations to generate one or more restoration results to address one or more detected failure conditions, and send at least a portion of the one or more restoration results to the computing environment in which the model is deployed.

For example, in one or more illustrative embodiments, instantiating the detection and restoration framework may comprise steps such as, but not limited to, selecting from a set of one or more available pre-built detection components, providing a set of one or more executable custom components, providing configuration parameters for detection components, selecting from a set of one or more available model restoration pipelines, providing a set of one or more executable custom model restoration pipelines, and providing configuration parameters for model restoration pipelines.

The techniques depicted in FIG. 1-5B can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIGS. 1-5B can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
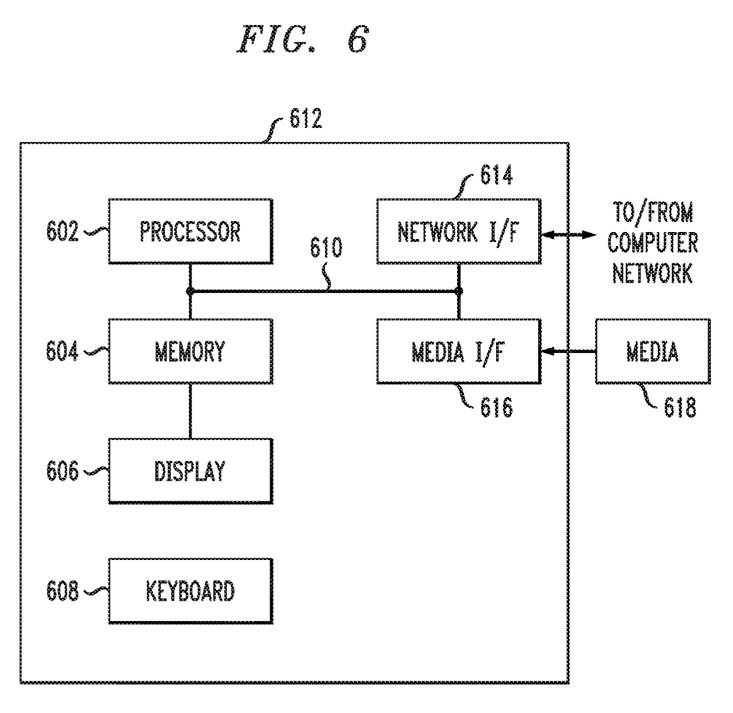
FIG. 6 depicts an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
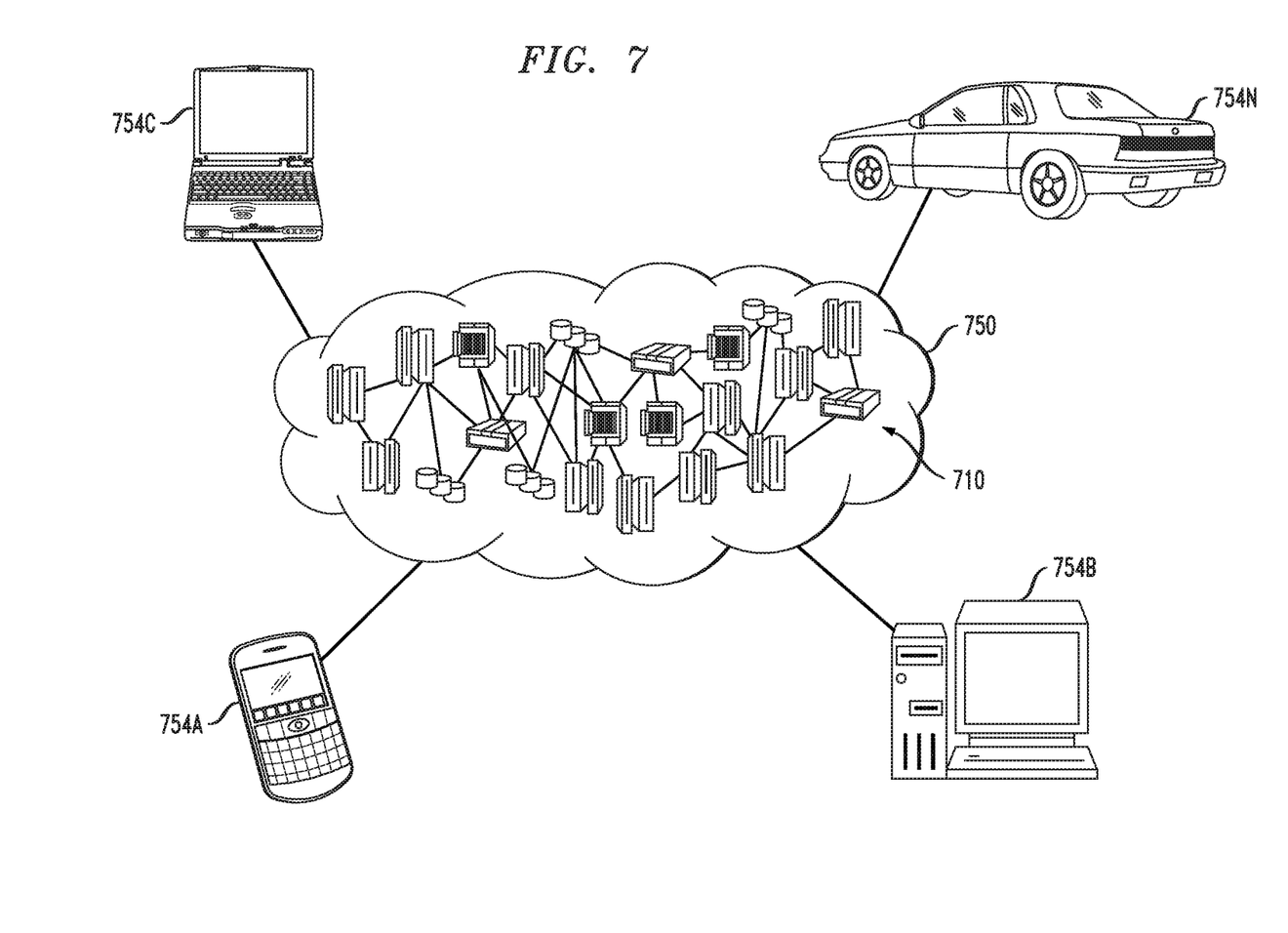
FIG. 7 depicts a cloud computing environment, according to an illustrative embodiment.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
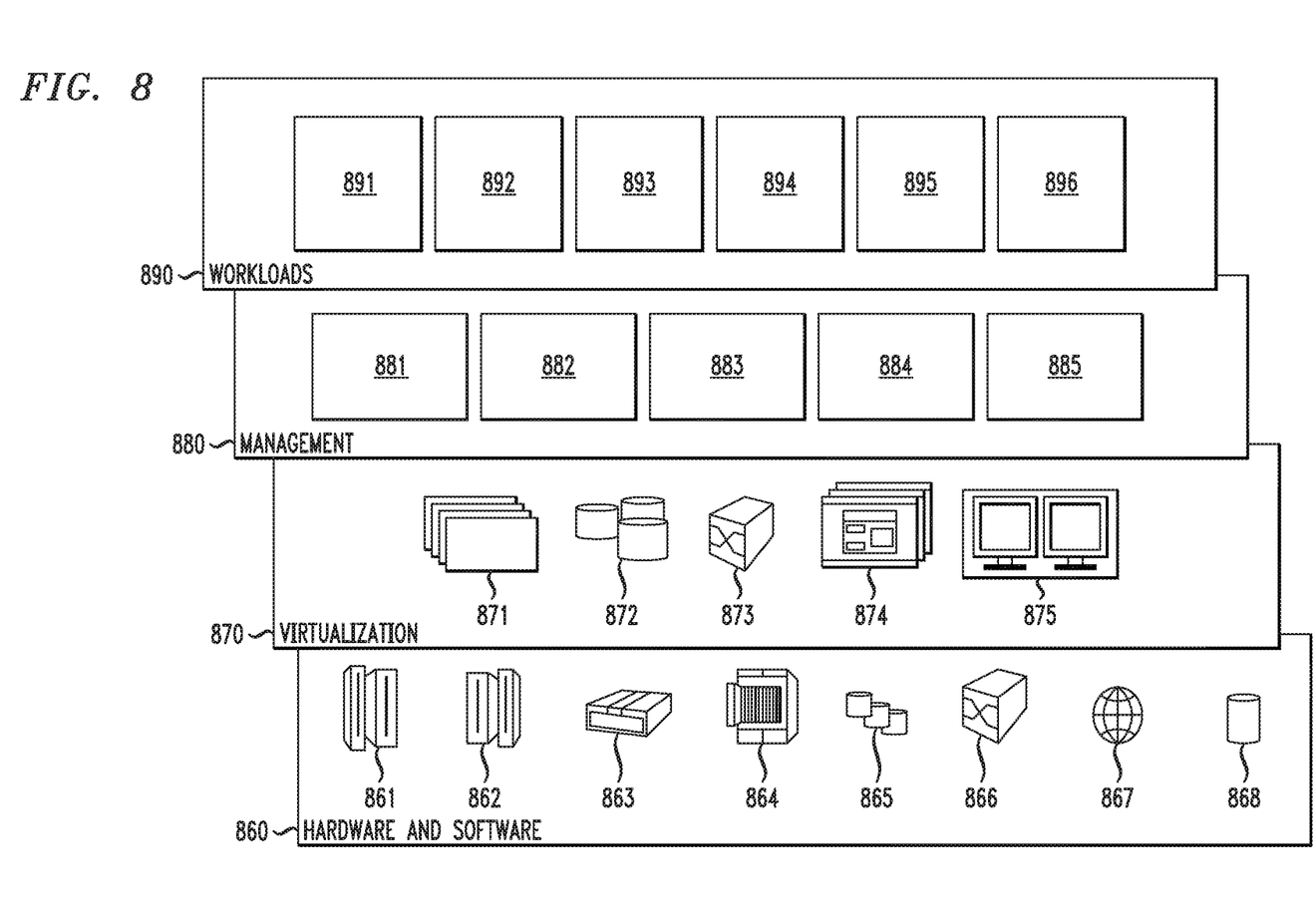
FIG. 8 depicts abstraction model layers, according to an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture-based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875. In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and configurable snapback framework 896, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, a framework (e.g., a set of one or more framework configurations) that replaces the complex manual (e.g., custom-built) development of model restoration logic. As illustratively described herein, the framework is configured and instantiated with a set of failure detection components and associated model restoration pipelines. Once instantiated, the framework plugs into a given lifecycle using logs as inputs and delivers new model artifacts for a new model version into the existing lifecycle pipelines. In one or more illustrative embodiments, the framework is a cloud-based framework and platform for end-to-end development and lifecycle management of AI applications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
at least one processor;
at least one memory including computer program code;
the at least one memory and the computer program code being configured to, with the at least one processor, cause the apparatus at least to:
obtain data associated with execution of a model deployed in a computing environment;
analyze at least a portion of the obtained data to detect one or more failure conditions associated with the model using one or more failure condition components;
execute one or more restoration operations to generate one or more restoration results to address one or more detected failure conditions using one or more restoration pipelines respectively operatively coupled to the one or more failure condition components; and
send at least a portion of the one or more restoration results to the computing environment in which the model is deployed;
wherein when multiple ones of the failure condition components trigger execution of multiple ones of the restoration pipelines, the at least one memory and the computer program code are further configured to, with the at least one processor, cause the apparatus at least to evaluate multiple restoration results generated by the multiple ones of the restoration pipelines and at least one of the evaluated restoration results is sent to the computing environment in which the model is deployed.

2. The apparatus of claim 1, wherein the at least one memory and the computer program code are further configured to, with the at least one processor, cause the apparatus at least to apply at least a portion of the one or more restoration results to the model.

3. The apparatus of claim 1, wherein the at least one memory and the computer program code are further configured to, with the at least one processor, cause the apparatus at least to validate the one or more restoration results prior to sending at least a portion of one or more restoration results to the computing environment in which the model is deployed.

4. The apparatus of claim 1, wherein the one or more restoration results comprise an updated version of the model.

5. The apparatus of claim 1, wherein the one or more restoration results comprise an updated training data set for the model.

6. The apparatus of claim 1, wherein the obtained data associated with execution of the model deployed in the computing environment comprises usage log data accumulated during a model runtime period.

7. The apparatus of claim 1, wherein the one or more failure condition components comprise one or more of a bias detection component, a drift detection component and a security threat level component.

8. The apparatus of claim 1, wherein the one or more restoration pipelines comprise one or more of a bias removal pipeline, a drift-responsive re-training pipeline and an adversarial training pipeline.

9. The apparatus of claim 1, wherein the at least one memory and the computer program code are further configured to, with the at least one processor, cause the apparatus at least to combine execution of the one or more restoration operations into a dynamically-constructed pipeline to generate the one or more restoration results to address one or more detected failure conditions.

10. The apparatus of claim 1, wherein the computing environment in which the model is deployed is a cloud computing environment.

11. A computer-implemented method comprising:
obtaining data associated with execution of a model deployed in a computing environment;
analyzing at least a portion of the obtained data to detect one or more failure conditions associated with the model using one or more failure condition components;
executing one or more restoration operations to generate one or more restoration results to address one or more detected failure conditions using one or more restoration pipelines respectively operatively coupled to the one or more failure condition components; and
sending at least a portion of the one or more restoration results to the computing environment in which the model is deployed;
wherein the one or more restoration pipelines comprise one or more of a bias removal pipeline, a drift-responsive re-training pipeline and an adversarial training pipeline.

12. The method of claim 11, further comprising applying at least a portion of the one or more restoration results to the model.

13. An article of manufacture comprising a non-transitory computer-readable storage medium having embodied therein executable program code that when executed by a processor causes the processor to perform the method of claim 11.

14. The method of claim 11, further comprising validating the one or more restoration results prior to sending the at least a portion of one or more restoration results to the computing environment in which the model is deployed.

15. The method of claim 11, wherein the one or more restoration results comprise an updated version of the model.

16. The method of claim 11, wherein the one or more restoration results comprise an updated training data set for the model.

17. The method of claim 11, wherein when multiple ones of the failure condition components trigger execution of multiple ones of the restoration pipelines, further comprising at least evaluating multiple restoration results generated by the multiple ones of the restoration pipelines and sending at least one of the evaluated restoration results to the computing environment in which the model is deployed.

18. A computer-implemented method comprising:
instantiating a detection and restoration framework; and
coupling the instantiated detection and restoration framework to a computing environment in which a model is deployed;
selectively obtaining at least one of a set of a plurality of failure detection components;
selectively obtaining at least one of a set of a plurality of restoration pipelines, wherein respective ones of the restoration pipelines are operatively coupled with respective ones of the failure detection components;
configuring the selectively obtained failure detection components and the selectively obtained restoration pipelines;
wherein the instantiated detection and restoration framework is configured to obtain data associated with execution of the model, analyze at least a portion of the obtained data to detect multiple failure conditions associated with the model using the failure detection components, execute restoration operations to generate multiple restoration results to address one or more detected failure conditions using the restoration pipelines respectively operatively coupled to the failure detection components, evaluate the multiple restoration results and send at least one of the evaluated restoration results to the computing environment in which the model is deployed.

19. An article of manufacture comprising a non-transitory computer-readable storage medium having embodied therein executable program code that when executed by a processor causes the processor to perform the method of claim 18.

20. The method of claim 18, wherein the restoration pipelines comprise one or more of a bias removal pipeline, a drift-responsive re-training pipeline and an adversarial training pipeline.

* * * * *